(12) United States Patent
Halvarsson et al.

(10) Patent No.: US 7,158,529 B2
(45) Date of Patent: Jan. 2, 2007

(54) DEVICE FOR DATA STREAM DECODING

(75) Inventors: Stig Halvarsson, Lund (SE); Ingemar Hammarström, Lund (SE)

(73) Assignee: Switchcore, AB, Lund (SE)

( * ) Notice: Subject to any disclaimer, the term of this patent is extended or adjusted under 35 U.S.C. 154(b) by 0 days.

(21) Appl. No.: 11/255,759

(22) Filed: Oct. 21, 2005

(65) Prior Publication Data

US 2006/0034312 A1    Feb. 16, 2006

Related U.S. Application Data

(63) Continuation of application No. 09/738,720, filed on Dec. 15, 2000, now Pat. No. 7,002,983.

(30) Foreign Application Priority Data

Dec. 17, 1999 (SE) ................................. 9904685

(51) Int. Cl.
*H04L 12/54* (2006.01)

(52) U.S. Cl. .................. 370/428; 365/230.06; 365/194

(58) Field of Classification Search ........... 365/230.06, 365/240; 370/428, 389, 392, 401, 537, 538, 370/540; 712/204, 207, 212
See application file for complete search history.

(56) References Cited

U.S. PATENT DOCUMENTS

| | | | |
|---|---|---|---|
| 4,128,879 A * | 12/1978 | Gardner ........................ 365/73 |
| 4,314,361 A * | 2/1982 | Jansen et al. ............... 365/221 |
| 4,488,255 A | 12/1984 | Krisher et al. |
| 4,748,595 A | 5/1988 | Mattausch |
| 5,142,494 A | 8/1992 | D'Luna |
| 5,241,429 A | 8/1993 | Holsinger |
| 5,371,864 A | 12/1994 | Chuang |
| 5,509,006 A | 4/1996 | Wilford et al. |
| 5,594,869 A | 1/1997 | Hawe et al. |
| 5,649,179 A | 7/1997 | Steenstra et al. |
| 5,757,416 A | 5/1998 | Birch et al. |
| 5,793,954 A | 8/1998 | Baker et al. |
| 5,872,783 A | 2/1999 | Chin |
| 5,917,821 A | 6/1999 | Gobuyan et al. |
| 5,966,544 A * | 10/1999 | Sager .......................... 712/32 |

(Continued)

FOREIGN PATENT DOCUMENTS

EP    0767565 A2    9/1996

(Continued)

*Primary Examiner*—Doris H. To
*Assistant Examiner*—Steven A Blount
(74) *Attorney, Agent, or Firm*—Pillsbury Winthrop et al.

(57) ABSTRACT

A device for data stream analyzing that is able to recognize different data streams and then start processors or functionalities to store or check data in a data stream. The device includes a processor means and a program memory, making it possible to parse a data stream in a way that is controlled by an interchangeable program. There will be no need for changing the hardware. This could save time and money for companies responsible for providing, maintaining and updating network switches. The device also includes a multiplexable data stream delayline for receiving the data streams, and multiplexing means for connecting different parts of the data stream to the processor.

24 Claims, 3 Drawing Sheets

U.S. PATENT DOCUMENTS

| | | |
|---|---|---|
| 6,119,154 A | 9/2000 | Weaver et al. |
| 6,215,722 B1 | 4/2001 | Park |
| 6,240,458 B1 | 5/2001 | Gilbertson |
| 6,510,069 B1 * | 1/2003 | Chien .......................... 365/49 |
| 6,598,034 B1 | 7/2003 | Kloth |
| 6,707,752 B1 * | 3/2004 | Zhang .................. 365/230.06 |
| 6,714,552 B1 | 3/2004 | Cotter |
| 6,804,162 B1 * | 10/2004 | Eldridge et al. ....... 365/230.03 |
| 7,002,983 B1 * | 2/2006 | Halvarsson et al. ........ 370/428 |

FOREIGN PATENT DOCUMENTS

| | | |
|---|---|---|
| EP | 0953897 A1 | 5/1998 |
| JP | 05058895 | 3/1993 |

* cited by examiner

DEVICE FOR DATA STREAM DECODING

CROSS-REFERENCE TO RELATED APPLICATIONS

This application is a continuation of U.S. application Ser. No. 09/738,720 filed on Dec. 15, 2000 now U.S. Pat. No. 7,002,983 which claims priority to Swedish application serial no. SE 9904685-6 filed on Dec. 17, 1999.

FIELD OF THE INVENTION

The present invention relates to packet switching, more specifically to data stream decoding and data stream analyzing.

BACKGROUND OF THE INVENTION

In the field of data and computer communications there is an increasing need for high speed/high bandwidth products. Prior art references relating to packet switching and more specifically to data stream decoding and pertinent to the present invention include: U.S. Pat. No. 5,509,006, JP 6/276198, EP 767565, EP 953897, and U.S. Pat. No. 5,594,869.

The problem of extracting address information in a switch from a packet in a data stream is in the prior art solved by applying masks on the content of one or more delay lines to filter out the required information. One disadvantage with this approach is the difficulty to adjust the switch to new communication protocols, because the masks are hardware implemented. Another disadvantage with the prior art is that the data in the delay line is only accessible at a certain position or certain positions, instead of being available all the time they reside in the delay line.

Accordingly, it is an object of the present invention to provide a device for improved programmable datastream analysis in the context of packet switching. In the context of this document a datastream can be any type of data stream, e.g. a bytewise Ethernet datastream in a computer network, including an Ethernet packet with different combinations of contents.

SUMMARY OF THE INVENTION

The invention relates to a device for data stream analyzing. Said device is able to recognize different data streams and then start other processors or functionalities to store or check data in a data stream. Special features are: a compare processor, a compare instruction memory, a data stream pipeline, a multiplexer and a multiplexer control unit, making it possible to test packet data under program control using several instructions and under several clock cycles even though the data is moving forward in the pipeline and even though other bytes of data are entering the device.

BRIEF DESCRIPTION OF THE DRAWINGS

The invention will be described in detail below with reference to the accompanying drawings in which.

DETAILED DESCRIPTION OF THE INVENTION

Figure 1:
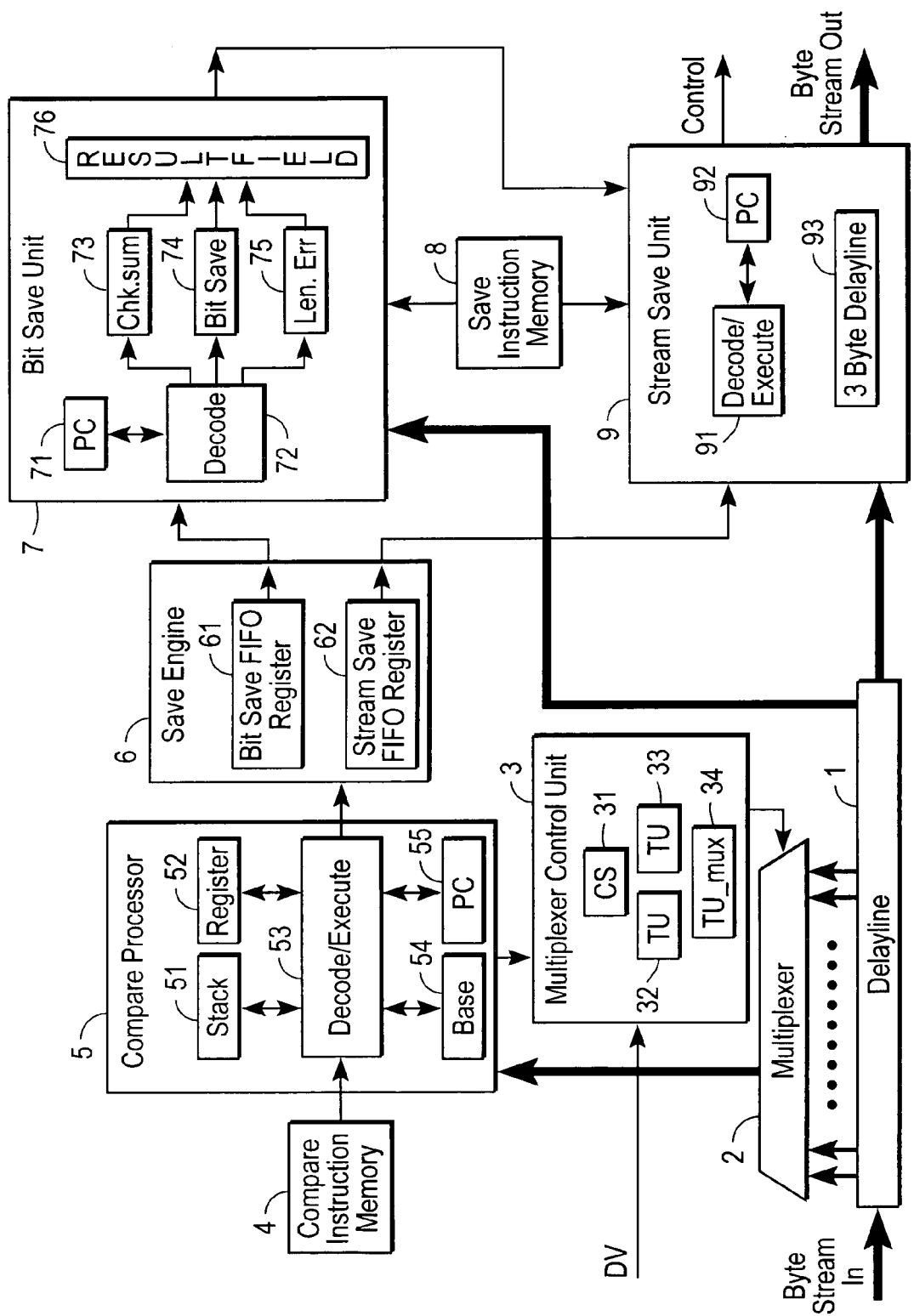
FIG. 1 is a block diagram of the invention

The invention is preferably implemented as an integrated circuit (IC) having an electrical interface to the outside. The invention comprises a number of physical or logical units as illustrated in FIG. 1, including;

a delayline 1
a multiplexer 2
a multplexer control unit 3
a compare processor 5
a compare instruction memory 4
a save engine 6
a bit save unit 7
a save instruction memory 8
a stream save unit 9
an address bus When a data stream enters the device of the invention, it is passed through a delayline 1, preferably a 23 shifts deep and 1 byte wide shift register. As long as a byte resides in the first 16 positions it can be accessed by the compare processor 5, which basically will act as a packet parser. The compare processor 5 is responsible for decoding the packets. It is also connected to a compare instruction memory 4 which inherits the parsing code.

One characteristic property of the invention is that every incoming byte in the data stream is numbered with a tag. When the compare processor 5 asks for a specific tag the multiplexer control unit 3 delivers the byte located at the right position.

When the compare processor 5 has come to some kind of conclusion it might want to report something to a result field or an option field, see below. This is done by starting up a save sequence. A start address for a save sequence will be sent from the compare processor 5 to the save engine 6. Said save engine 6 examine the incoming address and decides if it is a save regarding the result field or the option field. According to this decision the address is placed in either a bit save fifo register 61 or a stream save fifo register 62 respectively.

The bit save unit 7 has three functions: it can set bits in the result field, perform checksum control and length control.

The stream save unit 9 executes the instruction that saves the option field. Said stream save unit 9 also inserts the result field into the stream and regulates a number of control signals.

The delayline 1 preferably comprises a 23 shifts deep, 1 byte wide shift register. The 16 first positions of the shift register is reachable from the compare processor 5 through a multiplexer 2. The two last positions are connected to the two save units 7, 9 (bit save and stream save). The stream save unit 9 is actually only using the very last position, and only the bit save unit 7 needs the last two positions because the checksum control works with 16 bits at a time. There are five positions that are prevented from being accessed by the parsing function of the compare procesor 5 and by the save units 7, 9 (bit save and stream save). The reason for a delay before the byte stream arrives to the save units 7, 9 is that all start addresses sent from the compare processor 5 to the save units 7, 9 are queued in a fifo register. Depending on how many save sequences in the queue and how long they are, this might in some extreme situations generate an error. This is because vital data already have passed through the delayline before a save sequence is started. The actual delay needed to secure that no such error occurs is 4*64=192 clock cycles. 64 is the maximum length of a save sequence and 4 is the maximum of start addresses waiting to be executed. However, simulations have shown that five delay cycles are enough, since all save sequences normally written are very short.

A characteristic function of the invention is that it automatically keeps track of where a specific byte has its location in the delayline. The programmer only needs to specify which tag, i.e. which number the byte has, where the first byte in a packet is number zero, the second is number 1 and so on. This is why every byte arriving to the delayline 1 should be tagged (numbered). The tagging operating could easily be done by just adding an extra field in every shift in the delayline 1 inheriting the byte's tag. But this is disadvantageous in two aspects. First, much silicon would be used to implement the extra field in the delayline 1. Second, when the parser wants to look at a specific tag it would take a lot of time if every shift had to be searched to find the wanted tag.

Instead, the present invention has solved the above problem by making a part of the delayline multiplexable; said multiplexable part of the delayline preferably includes the 16 latest incoming bytes. Worst case for the length of a packet is 1 byte (erroneous), but since the first 12 bytes always contain the OSI Media Access Control address (MAC-address), no useful information can be extracted if the packet is shorter than 13 bytes. These packets will force the compare processor 5 to begin with the next packet at once and their DV (data valid) signal will be unset so the rest of the device or a switch will never see it. With a limit of at least two clock cycles (bytes) between different packets it is possible to guarantee that never more than two packets exist at the same time in the delayline 1.

According to the ethernet standard the IFG (Inter Frame Gap), which means the distance between packets, is at least 20 cycles, but a smaller distance is always desirable. E.g. a minimum distance of 6 cycles makes it possible to easily extend the device to be able to take care of SONET frames (An alternative ISO-OSI Layer 2 frame instead of ethernet).

Figure 2:
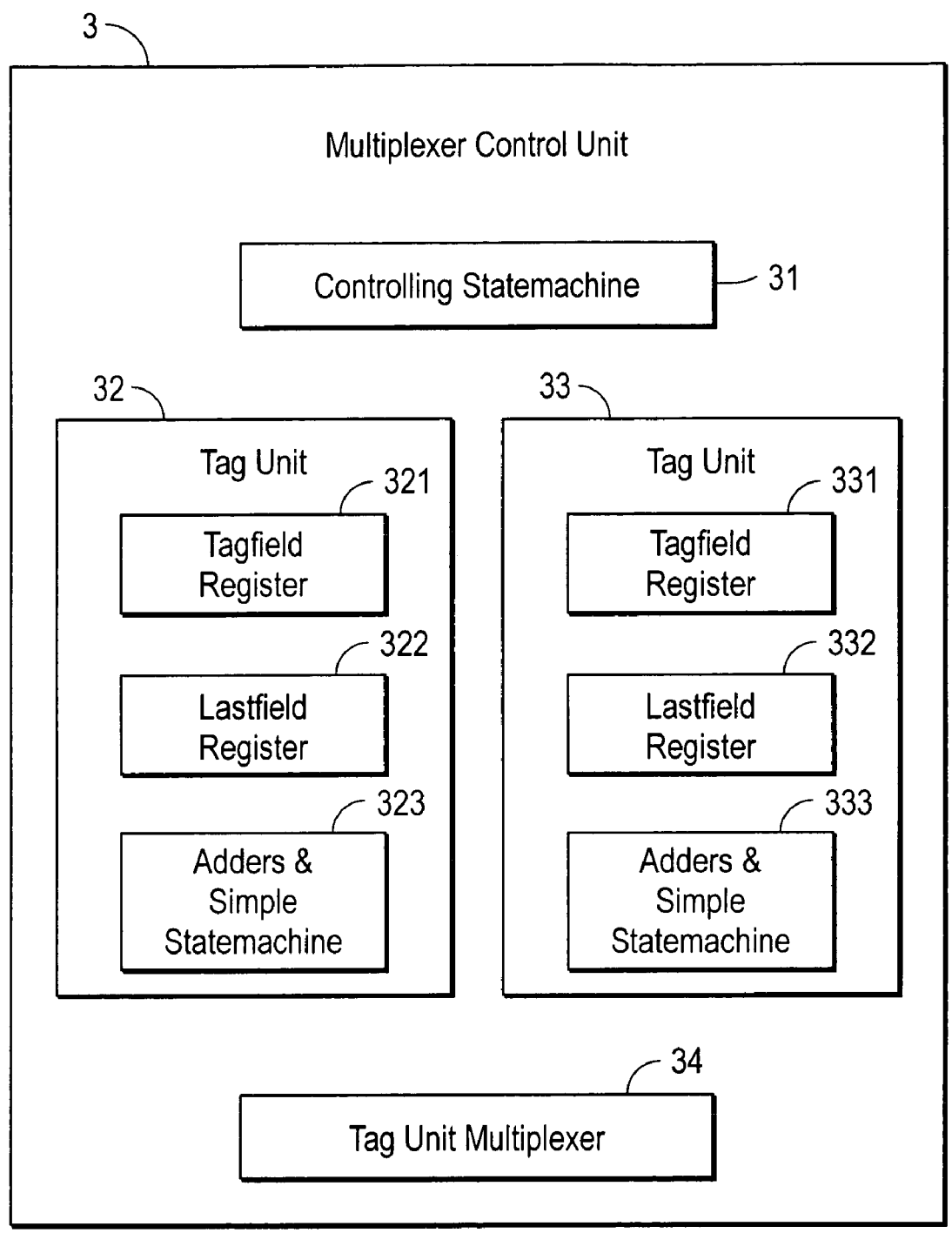
FIG. 2 is a block diagram of the multiplexer control unit of FIG. 1.

FIG. 2 illustrates that the multiplex control unit 3 uses two identical Tag Units 32, 33 (TU), one for each possible packet, a Controlling Statemachine 31 (CS) to control the TU:s 32, 33 and a TU muliplexer 34 to choose which one of the TU:s 32, 33 that the compare processor 5 is interested in. One TU includes a tagfield register 321, and a lastfield register 322, some adders and a simple statemachine 323: The other TU 33 is identical. When a packet arrives, the tagfield register 321 starts to increment for every byte. When the DV signal becomes false again the tagfield register 321 stops counting and the lastfield register 322 starts to increment. The TU 32 sends an "end of packet" signal when the lastfield register 322 reaches the number of shifts in the delayline 1. If the packet was shorter than 13 bytes a "too short" signal will be generated.

The position of a requested byte is located according to the expression $$p = tagfield + lastfield - wanted\_tag$$

In the above expression "p" is the position of the wanted byte in the delayline; "tagfield" is the value of the tagfield register (321 or 331); "lastfield" is the value of the lastfield register (322 or 332) and "wanted_tag" is the position of the wanted byte relative to the beginning of the packet.

A TU 32, 33 also generates a 'tag_error' signal if the requested tag never will be available or 'tag_soon' if the requested tag has not arrived to the delayline yet.

The controlling statemachine (CS) 31 is responsible for selecting a free TU (32 or 33) for an arriving packet and to pause the compare processor 5 when no new packets are available. The CS 31 will unselect a TU (32, 33) when the TU generates an 'end_of_packet' signal. An unselected TU (32, 33) will be reset to prepare it to receive the next incoming packet. The CS 31 is also controlling the TU multiplexer 34 to change its state every time the compare processor is asking for a new packet.

Referring again to FIG. 1, a feature of the device according to the present invention is that the compare processor 5 and the compare instruction memory 4 together act as a programmable parser. The description of the full instruction set of said parser is not set forth herein, but some instruction types are mentioned below. The parser uses four registers 51, 52, 54, 55 to fulfil its tasks.

One PC register 55 that holds the value of the program counter.

One general register 52. It can be used with instructions for arithmetic operations and for 'IF_THEN_ELSE' operations.

One base register 54. When the parser searches a tag, the value in the base register 54 is added to the searched tag value. This is used to be able to reuse instruction code for e.g. OSI Layer 3 frames, even if they are encapsulated in different OSI Layer 2 frames.

One stack address register 51 used to store addresses when subroutines are called with 'JUMP_SUBROUTINE' type instructions. Accordingly, 'RETURN' type instructions copy the stack back to the PC 55.

All instructions are executed in one clockcycle, except in two cases. This is possible because the compare processor unit receives two instructions every clockcycle from the compare instruction memory 4 which is of the double ported memory type. This features decreases the total amount of clock cycles needed for the compare processor 5 to parse a packet, thereby decreasing the needed size of the delayline. Some instructions are able to start save sequences. Said instructions have a field that tells what address in the save instruction memory 8 shall start the execution. Save address 0×00 will not generate a start of a save sequence.

The compare processor 5 must know when a new parsing is started so the registers 51, 52, 54, 55 can be reset. Therefore, when parsing of a packet is done, there shall be a 'jump_and_save' instruction with jump adress 0×7f (=last compare instruction memory 4 address). When this is detected it resets and starts looking for a new packet. If the compare processor 5 gets the signal 'too_short' it is reset. Further, a 'tag_soon' signal pauses the processor 5 and a 'tag_error' signal forces it to begin with the next packet.

The save engine 6 takes the address sent from the compare processor 5 and determines if it is the start address of a bit save sequence or a byte stream sequence. Thereafter, the address together with the current value of the base register 54 is put in the specific fifo 61, 62, The value of the base register 54 is needed for all save instructions that are using tag numbers. When the device according to the invention is programmed, a constant is written to the save engine 6 to tell where bit save sequences end in the save instruction memory 8. This feature exists because it is hard to tell how many instructions are needed to the different parts and it is more expensive to map two memories than one twice as big.

The bit save unit 7 writes to the result field 76. The result field 76 preferably consists of 24 bits or 3 bytes. It is controlled by the save instruction memory 8 and orders other units to execute the instructions. The executing units are:

Checksum

The checksum unit 73 executes a checksum control instruction which performs a 16-bit one complement addition. The unit needs to know what tag to start the execution from (Tag) and how many bytes the checksum should cover (Length). If there are checksum errors (i.e. the sum differs from 0×FFFF) the unit writes to the result field 76. Further, this block need the value of the base register 54 as it was when the compare processor 5 sent the start address of the current save sequence.

Bit

The bit unit 74 executes a bit save command which bitwise "xor"-ise one selected byte in the result field 76 with the data field. In other words, all bits which are set in the data field will invert the corresponding bit in the result field 76. It is only possible to invert one specific bit one time per packet, this is because e.g. an OSI Layer 3 error could be found in many ways, but if the bit which indicate a Layer 3 error is set an even number of times, this would look like a correct Layer 3 packet in the result field 76. The address field indicates which byte of the three possible bytes in the result field 76, should be written to.

Length Error

The length error unit 75 is the most complex unit and investigates lengths in a packet and is used with one or more length control instructions. In a network there might occur packets that have been cut off. This causes many kinds of errors, e.g. if layer 4 is shorter than two bytes the result field 76 should indicate Layer 3 error but not Layer 2 error. The length error unit 75 consists of two identical checkboxes and one controller. A checkbox needs to know at which tag to start the measurement from, what kind of comparison it is supposed to perform (more, less, equal or not equal) and what length to match this comparison to. If a checkbox detects a length error, a field which is part of the instruction indicates which bit, of four possible bits in the results field 76, should be written to. As with the checksum unit 73, this unit 75 also needs the value from the base register 54 as it was when the compare processor 5 sent the start address of the current save sequence.

The stream save executing unit 9 has only one save instruction to handle, a byte stream save instruction. Said instruction is used to save to the option field and includes a start tag number, a length and an six bit wide address to tell were in the option field the selected bytes are to be written. Besides of this it also inserts the result field 76 as soon as all bit save instructions are executed.

Interface

Figure 3:
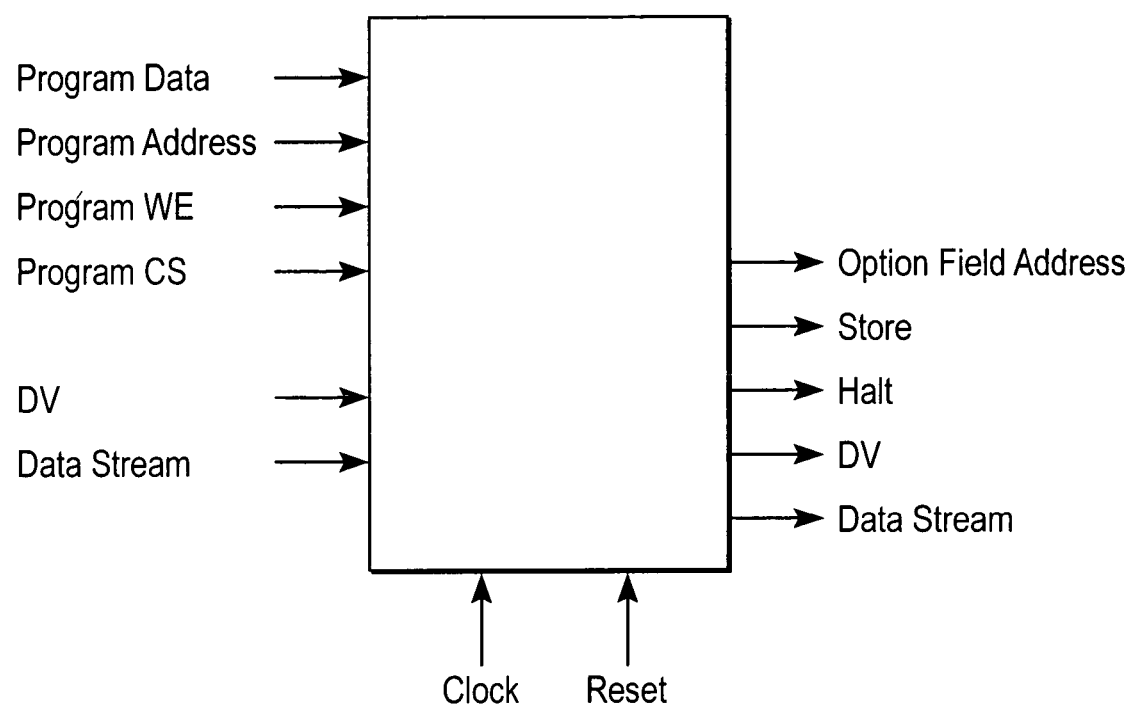
FIG. 3 is an interface overview of the invention

The electrical interface of a preferred embodiment of the invention to the outside world is described in conjunction with FIG. 3. It includes an input interface and an output interface. The input interface of the invention includes nine input terminals for a synchronous, eight bit wide, serial data stream, and a data valid (DV) signal, both used by the data that should be decoded. The input interface also includes a programming interface that comprises an 8-bit address bus, an 18-bit data bus, a chip select and a write enable signal for programming the two instructions. These 28 input terminals are used to program the invention after power on.

The output interface includes output terminals for a serial byte stream together with some control signals. The control signals include a data valid (1 bit), an option field address (6 bits), a store and a halt signal (1 bit each). The store signal tells if the current byte is to be stored in an option field, the halt signal together with the store signal tells if the stream out is the inserted result field. The address bus allows addressing in the option field.

A typical application for the present invention is for packet switching in a computer network together with a packet switch by extracting information, especially addresses, from the packet headers, because it is possible to test data using several instructions and under several clock cycles even though said data is moving forward in the delayline (1) and even though other bytes of data are entering the device. One of the features of the invention is that the decoding of the protocol is programmable. This is a major advantage because new or different types of protocols can be handled by just reprogramming the device. There will be no need for changing the hardware. This could save time and money for companies responsible for providing, maintaining and updating network switches.

The invention claimed is:

1. A device for analyzing a data stream comprising:
a delayline that receives the data stream and maintains a predetermined number of the latest incoming bytes of the data stream;
a control unit that keeps track of the location of a specific byte in the delayline and generates a tag corresponding to the specific byte;
a processor that parses the data stream by requesting the specific byte using the tag; and
a multiplexer coupled to the delayline that receives information corresponding to the location from the control unit and thereby retrieves the specific byte from the delayline for provision to the processor.

2. The device of claim 1, further comprising: an interchangeable program executed by the processor to parse the data stream.

3. The device of claim 2, further comprising: a rewritable program memory for storing the interchangeable program.

4. The device of claim 3, further comprising a programming interface coupled to the rewritable program memory.

5. The device of claim 3 wherein a first instance of the interchangeable program stored in the program memory is adapted for a first network protocol and a second instance of the second interchangeable program stored in the program memory is adapted for a different second network protocol.

6. The device of claim 1 wherein the incoming data stream contains packets of data and the tag generated corresponds to the location of a byte within a packet of data.

7. The device of claim 1 wherein the control unit comprises a first and second position register that changes in a predetermined way when the data stream is forwarded in the delayline.

8. The device of claim 1, further comprising:
a base address register for the processor to enable code to be reused by recognizing a given pattern even if it starts at different positions in the data stream.

9. The device of claim 1 wherein the delayline contains a 23 shift deep, 1 byte wide shift register.

10. The device of claim 1 wherein the delayline maintains a predetermined number of bytes that corresponds to an expected packet size.

11. The device of claim 10 wherein the delayline maintains equal to or less than two packets at the same time.

12. The device of claim 1 wherein the processor parses the data stream according to a specific network protocol.

13. The device of claim 12 wherein the network protocol is MAC.

14. The device of claim 1, further comprising: a plurality of registers for performing operations on the data stream before an actual comparison of data in the data stream with other data is executed.

15. The device of claim 14 wherein the plurality of registers form a length-error unit which executes a length control instruction on the data stream.

16. The device of claim 14 wherein the plurality of registers form a checksum unit which executes a checksum control instruction on the data stream.

17. A method for data stream analyzing comprising the steps of:
   receiving a data stream and maintaining a predetermined number of the latest incoming bytes of the data stream in a delayline;
   keeping track of the location of a specific byte in the delayline;
   generating a tag corresponding to the specific byte;
   parsing the data stream by a processor that requests the specific byte by its tag: and
   retrieving the specific byte from the delayline for provision to the processor in accordance with information corresponding to the tracked location and in response to the request by the processor.

18. The method of claim 17 further comprising storing an interchangeable program to be executed by the processor for parsing the data stream.

19. The method of claim 18 wherein a first instance of the interchangeable program is adapted for a first network protocol and a second instance of the interchangeable program is adapted for a second, different network protocol.

20. The method of claim 17 wherein the parsing step is performed in accordance with a specific network protocol.

21. The method of claim 20 wherein the network protocol is MAC.

22. The method of claim 17 wherein the incoming data stream contains packets of data and the tag generated corresponds to the location of a byte within a packet of data.

23. The method of claim 17 further comprising changing values in first and second position registers in a predetermined way when the data stream is forwarded in the delayline.

24. The method of claim 17 wherein the number of bytes maintained in the delayline corresponds to an expected packet size.

* * * * *